United States Patent
Ruutu et al.

(10) Patent No.: US 7,274,939 B2
(45) Date of Patent: Sep. 25, 2007

(54) CELLULAR RADIO LOCATOR SYSTEM

(75) Inventors: Ville Ruutu, Espoo (FI); Timo Rantalainen, Helsinki (FI); Marko Alanen, Helsinki (FI); Gudni Gunnarson, Tampere (FI); Olli Hyvärinen, Tampere (FI)

(73) Assignee: Nokia Corporation, Espoo (FI)

( * ) Notice: Subject to any disclaimer, the term of this patent is extended or adjusted under 35 U.S.C. 154(b) by 967 days.

(21) Appl. No.: 09/231,066

(22) Filed: Jan. 14, 1999

(65) Prior Publication Data

US 2002/0077115 A1 Jun. 20, 2002

(30) Foreign Application Priority Data

Jan. 15, 1998 (FI) .................................... 980077

(51) Int. Cl.
*H04Q 7/20* (2006.01)
(52) U.S. Cl. .................................. 455/456.1; 455/455
(58) Field of Classification Search ................ 455/456, 455/434, 440, 437, 525, 186.1, 422.1, 456.1–456.5, 455/185.1, 502, 67.16, 455, 432.1; 370/350, 370/328, 324
See application file for complete search history.

(56) References Cited

U.S. PATENT DOCUMENTS

| | | | | |
|---|---|---|---|---|
| 5,128,925 A | | 7/1992 | Dornstetter et al. | 370/17 |
| 5,564,079 A | * | 10/1996 | Olsson | 455/54.1 |
| 5,701,585 A | * | 12/1997 | Kallin et al. | 455/33.2 |
| 5,799,255 A | | 8/1998 | Berg et al. | 455/551 |
| 6,002,936 A | * | 12/1999 | Roel-Ng et al. | 455/456 |
| 6,061,337 A | * | 5/2000 | Light et al. | 370/331 |
| 6,108,553 A | * | 8/2000 | Silventoinen et al. | 455/456 |
| 6,108,558 A | * | 8/2000 | Vanderspool, II | 455/456 |
| 6,138,003 A | * | 10/2000 | Kingdon et al. | 455/410 |

(Continued)

FOREIGN PATENT DOCUMENTS

EP 0662758 A2 7/1995

(Continued)

OTHER PUBLICATIONS

"An Adaptive Mobile Wireless Handover", Smith et al., Proceedings Of The Annual International Computer Software And Applications Conference, IEEE Comp. Soc. Press, vol. Conf. 21, pp. 486-492, no date provided.

(Continued)

*Primary Examiner*—Naghmeh Mehrpour
(74) *Attorney, Agent, or Firm*—Perman & Green, LLP

(57) ABSTRACT

A cellular radio network based positioning system for determining the position of a mobile station (16). For each base transceiver station (1 to 5) or cell of the network, a fixed list of base transceiver stations is stored by a Mobile Positioning Centre (13). Each list identifies those base transceiver stations which enable the position of a mobile station served by the corresponding base transceiver station (6) to be optimally determined. The list is transmitted to the mobile station (16) via the serving base transceiver station (6) and the mobile station determines an observed time difference for each of the listed base transceiver stations, relative to the serving base transceiver station (6), from signals broadcast by the listed base transceiver stations. The observed time differences are transmitted from the mobile station (6) to the serving base transceiver station (6) and are used by the network to compute the position of the mobile station (16).

15 Claims, 2 Drawing Sheets

U.S. PATENT DOCUMENTS 6,201,803 B1 * 3/2001 Munday et al. ............. 370/350
6,324,406 B1 * 11/2001 Zadeh ........................ 455/456

FOREIGN PATENT DOCUMENTS

| EP | 0 767 594 A2 | 4/1997 |
| WO | WO92/05672 | 4/1992 |
| WO | WO96/35306 | 11/1996 |
| WO | WO97/27711 | 7/1997 |

OTHER PUBLICATIONS

"The Pseudo-Synchronisation, A Costless Feature To Obtain The Gains Of A Synchronised Cellular Network", Mouly et al., MRC Mobile Radio Conference, pp. 51-55, no date provided.

* cited by examiner

CELLULAR RADIO LOCATOR SYSTEM

FIELD OF THE INVENTION

The present invention relates to a method and apparatus for determining the position of a mobile communications device in a cellular radio telephone network.

BACKGROUND OF THE INVENTION

A cellular radio telephone network is made up of Base Transceiver Stations (BTS) each serving a corresponding, geographical "cell" area. Groups of several adjacent cells are organised into what are known as "Location Areas" (LA). If the MS is actively communicating with the network, e.g. the user is conducting a telephone call, the actual cell within the LA in which the MS is present is known to the network. However, when the MS is switched on but not actively used (i.e. it is IDLE or "camping"), the network only knows the LA but not the actual cell in which the MS is present. Cell sizes vary considerably and even if the network knows the cell in which the MS is present the position of the MS can only be identified with a resolution equal to the cell size.

Future cellular systems may be required to determine the position of a MS with a considerably better precision than can currently be obtained. For example, the United States Federal Communication Commission (FCC) has specified that when a MS is used to make an emergency call the network must be able to locate the MS with an accuracy of 125 meters in 67 percent of cases. Such precise position determination has many other desirable applications such as for taxi dispatch and for monitoring the whereabouts of vehicles, objects and persons etc.

One possible way to provide the necessary precision is to incorporate a satellite based positioning system, like the Global Positioning System (GPS), into a MS. GPS can be used almost without geographical restrictions, but this solution is complex and increases the cost, size and power consumption of a MS. Moreover, GPS has additional problems including; low signal levels inside buildings, the difficulty in obtaining a clear path to at least three satellites in built-up urban areas, and the relatively long time to obtain a first GPS positional fix after switch-on.

It appears that a cellular MS locating system based on the cellular radio system offers the best and most practical solution. A number of proposals have been made based either on direction finding, field strength or time measurements. In particular, proposals have been made which rely upon determining the position of a MS from information transmitted to the MS from BTSs serving the cell in which the MS is present and/or adjacent cells.

One proposal includes triangulation of the position of a MS using at least two direction finding receivers within the network, e.g. incorporated into respective BTSs. Within built-up urban areas, multipath signals will degrade position precision unless the disturbing multipath distortion is removed from observed signals. However, good direction finding receivers having this capability are expensive and bulky and as such this method is unlikely to be suitable for large-scale cellular radio locating.

A second proposal relies upon measuring the relative field strengths of signals received at a MS from at least three BTSs. However, it will be appreciated that field strength is likely to vary considerable and in an unpredictable manner over the geographical coverage area of a BTS. This renders the method unsuitable in practise for cellular radio positioning.

A third proposal requires measurement of time delays in signals transmitted to a MS from several adjacent BTSs (or vice versa). Measured delays are converted into respective distances and a simple circle intersecting method can be used to determine a MS position. Such a position determining method, adapted for the GSM cellular radio system, is described for example in WO 92/05672 and WO 97/27711. The methods makes use of transmission Time Advance (TA) values already calculated in GSM transmissions in order to ensure synchronisation of MSs to BTSs (i.e. so that transmissions from a MS arrive at a BTS in the right time slot regardless of the distance between the MS and the BTS). FIG. 1 illustrates a TA value based position determining method.

FIG. 2 illustrates another time delay based positioning system in which Observed Time Differences (OTD) are utilised. EP0767594 describes such a system adapted for the GSM cellular radio system. The system has the advantage that OTDs can be obtained without having to register the MS with all of the BTSs used for position determination, as is the case with the TA value based systems.

Time delay based systems provide a cost-effective and simple solution to the problem of providing high accuracy position determination. However, accuracy is critically dependent upon the position of the BTSs relative to a MS whose position is to be determined. FIG. 3a illustrates an example of a good measurement geometry, where each pair of BTSs locates a MS along a hyperbola, and the set of hyperbolas intersect with large contact angles. In contrast, FIG. 3b illustrates an example of a bad measurement geometry where the hyperbolas intersect with small contact angles.

SUMMARY OF THE INVENTION

It is an object of the present invention to overcome or at least mitigate the above noted disadvantages. The present invention achieves this and other objects by dynamically notifying a MS of BTSs suitable for position determination purposes, whenever the position of the MS is to be determined, or by notifying the MS of BTSs to be excluded from use in such determinations.

According to a first aspect of the present invention there is provided a method of determining the position of a mobile communications device within a cellular network, the method comprising the steps of:

transmitting data to the mobile communication device from the cellular network, said data identifying to the mobile communication device a list of radio channels corresponding to respective radio transmitters of the cellular network, said list being determined on the basis of the approximate position of the mobile communication device; and causing the mobile communication device to listen on said identified channels, or on other channels excluding said identified channels, and to determine from information transmitted over the listened to channels data values related to the relative geometry of the mobile communication device and the radio transmitters transmitting the listened to channels; and determining the position of the mobile communication device using said determined data values.

By forcing a mobile communications device to use preselected radio transmitters for position determination measurements, or by excluding certain radio transmitters, the measurement process may be optimised for any given geographical area. The choice of radio transmitters to be used is not left solely to the mobile device and the risk of selecting radio transmitters having a poor measurement geometry, or other disadvantageous properties, is reduced.

Preferably, said transmitters are provided by respective base transceiver stations and the data transmitted to the mobile device identifying the list of radio channels comprises a set of radio channel numbers known to the mobile device.

Preferably, said data values are time relationship values related to the transmission delay times between the mobile device and the radio transmitters transmitting the listened to channels. More preferably, the time relationship values are Observed Time Differences (OTD). Each OTD is the difference between the transmission delay time between the mobile device and one of the radio transmitters transmitting the listened to channels, and the transmission delay time between the mobile device and a radio transmitter of a base transceiver station currently serving the mobile device.

In alternative embodiments of the present invention, the time relationship values are Timing Advance (TA) values equal to twice the transmission delay time between the mobile device and respective ones of the radio transmitters transmitting the listened to channels.

Preferably, said time relationship values are sent by the mobile communications device to the network where said determining step is carried out.

The present invention may also be applied to other position determining methods such as those involving relative field strength measurements and direction finding.

In preferred embodiments of the present invention, the list of radio channels identified to the mobile device contains those channels which the mobile device should try to listen to in order to obtain said data values from which the position of the mobile device can be determined. In some circumstances, a mobile device may only be able to receive said transmitted information from a sub-set of the listed channels (e.g. because the signal level of the other channels is too low at the mobile device). However, providing that a minimum number of channels can be adequately received (e.g. two) it may still be possible to determine the position of the mobile device.

In other embodiments of the present invention, the network identifies to the mobile device one or more radio channels which should not be used for position determination. This may be desirable, for example, to exclude the use of multiple radio transmitters at the same location. A mobile device may then itself select suitable radio channels, excluding the identified channels, by for example scanning the radio spectrum. The radio channels, or transmitters, selected by the mobile device are identified to the network together with the measurement data. According to a second aspect of the present invention there is provided apparatus for determining the position of a mobile communications device within a cellular network, the apparatus comprising:

a base transceiver station for transmitting data to the mobile communication device from the cellular network, said data identifying to the mobile communication device a list of radio channels corresponding to respective radio transmitters of the cellular network, said list being determined on the basis of the approximate position of the mobile communication device;

a radio receiver at the mobile communication device for listening on said identified channels, or on other channels excluding said identified channels;

first signal processing means coupled to said radio receiver for determining from information transmitted over the listened to channels data values related to the relative geometry of the mobile communication device and the radio transmitters transmitting the listened to channels; and second signal processing means for computing the position of the mobile communication device using said determined data values. According to a third aspect of the present invention there is provided a mobile communications device comprising:

a radio receiver for receiving data transmitted from a serving base transceiver station of a cellular radio network, said data identifying to the mobile communication device a list of radio channels corresponding to respective radio transmitters of the cellular network, and said list being determined on the basis of the approximate position of the mobile communication device, and said radio receiver being arranged to listen on said identified channels, or on other channels excluding said identified channels;

first signal processing means coupled to said radio receiver for determining from information transmitted over the listened to channels data values related to the relative geometry of the mobile communication device and the radio transmitters transmitting the listened to channels; and a radio transmitter for transmitting said determined data values to said serving base transceiver station.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION

Figure 4:
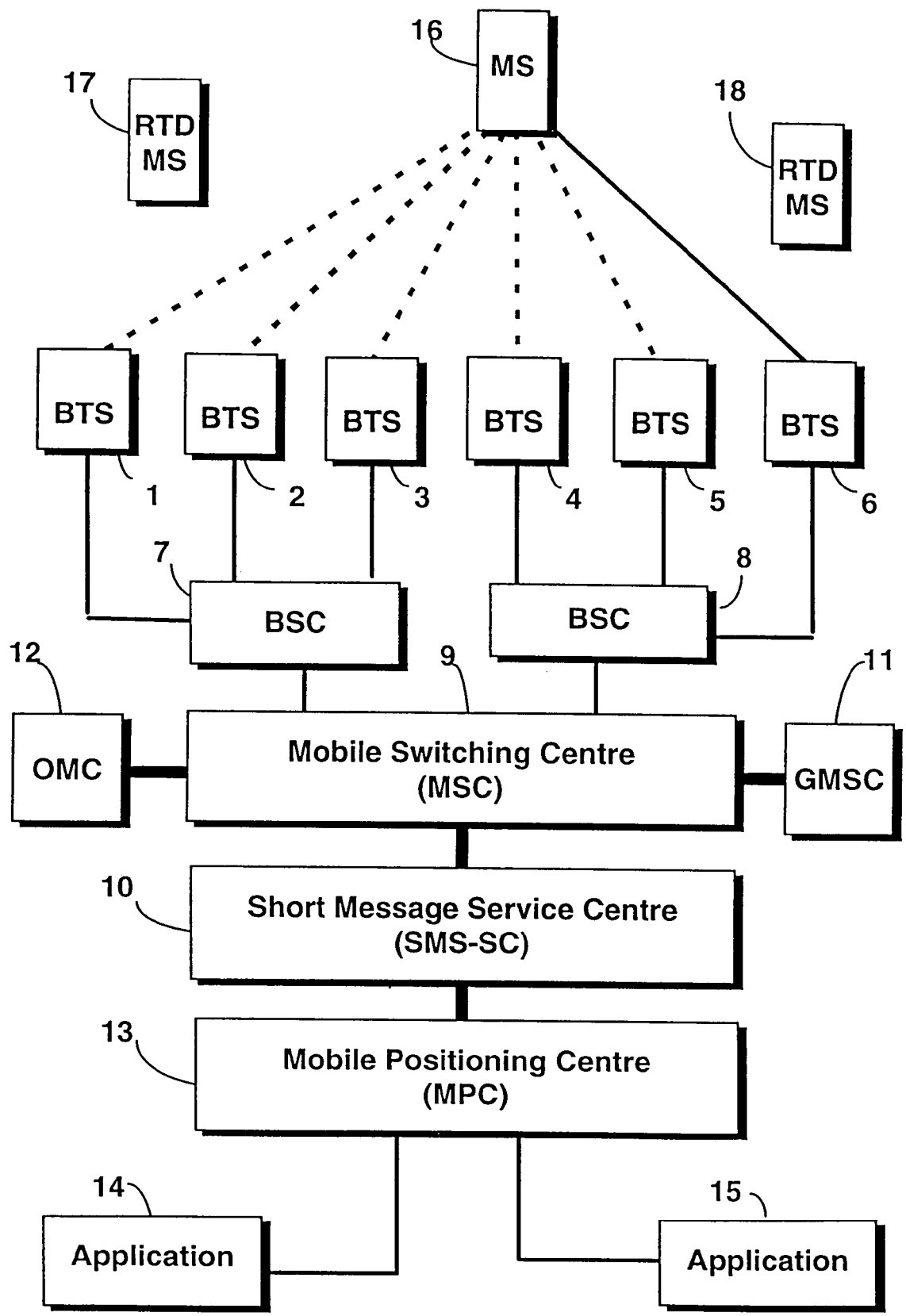
FIG. 4 illustrates a GSM system arranged to implement a method embodying the present invention.

A typical GSM network that is designed to implement the present invention is shown in FIG. 4. The network has inter alia Base Transceiver Stations (BTS) 1 to 6, Base Station Controllers (BSC) 7, 8 (each BSC controlling a subset of BTSs), a Mobile Switching Centre (MSC) 9 linked to the two BSCs 7, 8, and a Short Message Service-Service Centre (SMS-SC) 10.

The network uses a Home Location Register (HLR) and a Visitor Location Register (VLR), not shown in FIG. 4, to maintain the status and LA of a MS, or the address of a foreign network if the MS is not registered to its home network. The MSC 9 of the network communicates with additional networks, including a Public Switched Telephone Network (PSTN), through a Gateway MSC (GMSC) 11, and with an Operation and Maintenance Centre (OMC) 12. The OMC 12 maintains and updates information in the network. A Mobile Positioning Centre (MPC) 13 is added to the conventional GSM network architecture and is used by location applications 14,15 which are also additional to the conventional GSM network architecture.

FIG. 4 shows a MS 16 which, for the purposes of this explanation, is assumed to be able to receive transmissions from each of BTSs 1 to 6. At any given time, the MS is registered to only one BTS (BTS 6 in FIG. 4) which is termed the "serving" BTS. User data and signalling data are communicated between the network and the MS 16 via this serving BTS 6. However, the MS 16 also continuously monitors the level of signals received from the other surrounding BTSs 1 to 5 for the purpose of facilitating a handover, e.g. when the MS 16 crosses from the serving area of one BTS to that of another BTS. These surrounding BTSs 1 to 5 are identified to the MS 16 by the controlling BSC 8, via the serving BTS 6, when the MS 16 is actively communicating with the network. The MS 16 reports the measured signal levels, over a Slow Associated Control Channel (SACH), to the BSC 8 via the BTS 6. From the received signal levels, the BSC 8 can determine whether the MS 16 should be handed over to another BTS 1 to 5 and/or whether a new "handover" list of BTSs, for monitoring by the MS 16, should be transmitted to the MS 16.

The GSM system is a Time Division Multiple Access (TDMA) based system in which data is transmitted between the network and MSs in time slots allocated to MSs. A TDMA frame is divided into eight time slots. A consequence of this method is the MS 16 must be synchronised with the serving BTS 6 in order to ensure that data transmitted from the MS 16 is received at the BTS 6 in the time slot allocated to the MS 16, and that signals received by the MS 16 are sampled at the correct points in time. Data sent from the BTS 6 to the MS 16 contains synchronisation sequences which are known to the MS 16 and which allow the MS 16 to "lock-on" to the BTS 6 transmissions. The internal clock of the MS 16 is thus synchronised with that of the BTS 6 but with an offset corresponding to the transmission delay time between the serving BTS 6 and the MS 16. The propagation time delay between the MS 16 and the BTS 16 is computed (at regular time intervals) and sent from the BTS 6 to the MS 16 as a Timing Advance Value (TAV) to allow the MS 16 to compensate for the propagation delay in its transmissions.

Figure 3:
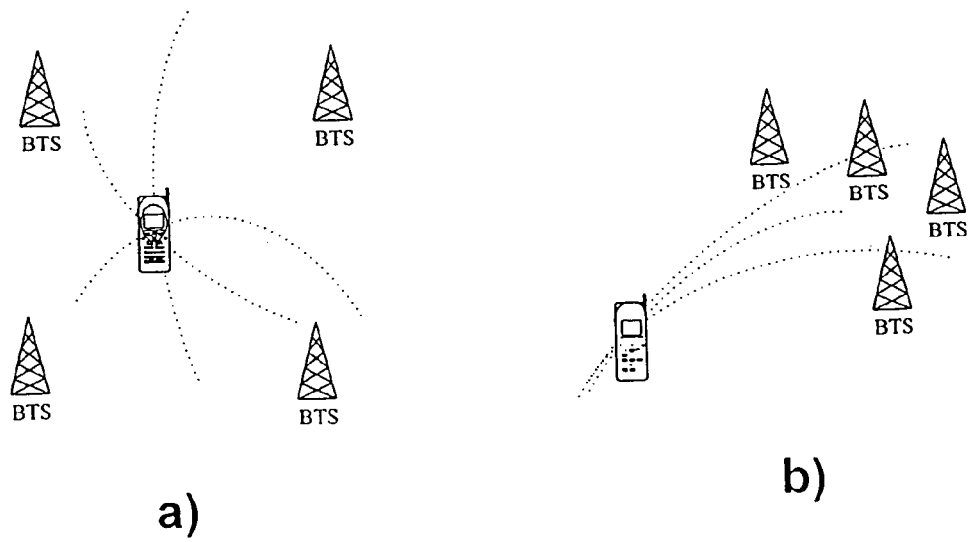
FIG. 3 illustrates good and bad base transceiver station geometries for use in the Observed Time Difference method of FIG. 2.

Assume that one of the network applications 14,15 requests that the position of the MS 16 be determined. This request may be initiated by the MS 16 itself, by the network, or by a remote subscriber or connection, and is passed to the MPC 13. For each BTS, the MPC 13 holds a "locating" list of other BTSs suitable for determining the position of a MS served by that BTS. This information has been provided to the MPC 13 by the OMC 12. Upon receipt of the position determining request, the MPC 13 enquires from the registers (HLR and VLR) in the MSC 9 the status of the MS 16 and, if the MS 16 is active, the serving BTS. If the MS is not currently active, but is reported as switched on, then the MSC 9 will page the BTSs in the LA to determine the serving BTS. The MPC 13 selects the set of BTSs corresponding to the serving BTS and this set or list is transmitted to the MS 16 via the serving BTS 6. The selected location list may identify a minimum of two BTSs. These may be ones of the BTSs already identified in the handover list, i.e. BTSs 1 to 5, or the location list may include other BTSs. It will be appreciated that BTSs suitable for use in position determination can be relatively remote from the MS 16 as only a unidirectional radio link, from the BTS to the MS 16, is required. The important point is that the identified BTSs have an optimal, or near optimal, geometry for position determination (see FIG. 3A).

Figure 1:
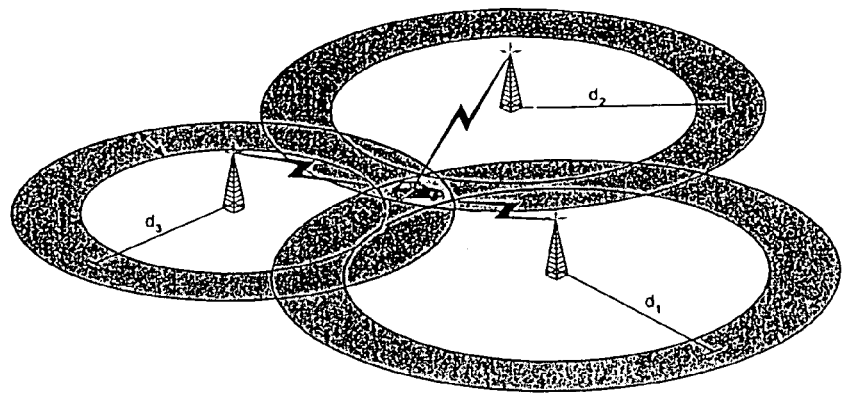
FIG. 1 illustrates a Timing Advance value method of determining the position of a MS.
Figure 2:
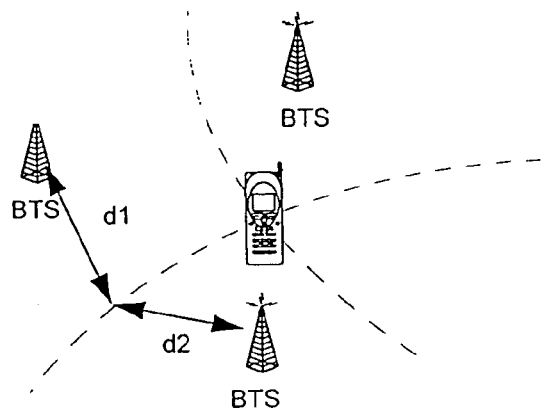
FIG. 2 illustrates an Observed Time Difference method of obtaining the position of a MS.

The MS 16 has a memory for storing the received location list of BTSs. This memory may be the same memory used to store the handover list of BTSs. The MS 16 listens to each of the radio channels (BroadCast CHannels BCCH) of the respective listed BTSs in turn to identify the time of receipt (relative to the MS's internal clock) of known synchronisation sequences. Assuming that synchronisation sequences are transmitted by the serving BTS 6 and one of the listed BTSs at the same time, then the difference in the time of arrival of the sequence at the MS 16 (the Observed Time Difference OTD) would correspond to the difference in the propagation delays between the MS 6 and the two BTSs. This would allow the position of the MS 6 to be placed on a hyperbola as shown in FIG. 2. However, it is unlikely that the synchronisation sequences are transmitted by different BTSs at the same time, i.e. there exists a Real Time Difference (RTD) offset between the serving BTS 6 and each listed BTS. The actual propagation delay difference (the Geometric Time Difference GTD) is therefore given by GTD=OTD−RTD.

In order to determine the RTD between the serving BTS 6 and one of the listed BTSs, use is made of a radio terminal whose position is fixed and known to the network. FIG. 4 illustrates two such terminals 17, 18. As the position of the terminal is known, the GTD for any two BTSs is also known. By obtaining an OTD measurement for a pair of BTSs, the RTD value for that pair can be derived. When an OTD measurement is obtained for the MS 6, whose position is unknown and to be determined, the corresponding GTD can be obtained using the measured OTD and the calculated RTD. A list of neighbouring BSTs for which RTDs are required is sent from the serving BTS to the RTD MSs 17, 18. For a more detailed description of this computation, the reader is referred to EP0767594.

As has already been mentioned, FIG. 4 shows a system resource 5 termed the Short Message Service-Service Centre SMS-SC. A SMS is a 160 character, text only message format which operates separately from the voice service of the GSM cellular radio network and is specified by an ETSI GSM recommendation.

The recommendation describes the connection of the Service Centre to a Mobile Switching Centre (MSC), such as the MSC 9 in FIG. 4, and also describes the operation of the Service Centre (SC) in connection with sending and relaying SMS messages. This existing service may advantageously be used to relay the MS 16 OTD values to the MPC 13 where the values are used to compute the position of the MS 16.

The only significant addition to implement the enhanced cellular radio positioning method described above is thus the MPC 13. The MPC can be implemented as a stand alone application (as shown in FIG. 4) or may run for example in the SMS Service Centre 10. In either case, the MPC 13 is a database with embedded control, calculation and maintenance programs handling the tasks initiated by the application programs 14,15. The MPC performs the following steps:

receiving a position determining request from an application 14,15;
requesting the identity of the BTS serving the MS from the GSM system;
selecting a list of BTSs based on the serving BTS identity from the database;
incorporating the selected list in a reporting command;
requesting the GSM system to send the report command to the MS;
waiting for a reply while processing other pending position determining requests;
receiving a reply in the form of a SMS message from the MS via the SMSSC;
computing a position using the measurements reported by the MS; and sending the computed position to the applications 14, 15.

As an alternative to the use of SMS for sending position data between the serving BTS 6 and the MS 16, data may be transmitted for example on a packet data channel (e.g. in a General Packet Radio Service GPRS) or using an Unstructured Supplementary Data service (USSD).

In some circumstances, a MS may determine OSDs for BTSs of its own accord, e.g. using the handover list. These may then be sent to the network where the position of the mobile is determined. If the determined position is not accurate enough for the purposes of the network, then a list of BTSs may be sent to the MS from the MPS to enable a new set of OSDs to be determined. This iteration could be carried out several times. It is also possible that a MS could be continuously determining OSDs for the BTSs contained in the handover list, or elsewhere. The current set could then be sent to the network following receipt by the MS of a request for position determination. The iterative process may then be carried out based on the initial approximate determination.

In the embodiment described above, "raw" OTD values are sent to the MPC 13 where the position of the MS 16 is computed. The MS 16 may of course itself compute its own position if it knows the location of the BTSs identified in the location list and the various RTDs. This additional information may be sent to the MS together with the location list or separately on a signalling channel.

In order to improve the accuracy of a position determination measurement, a number of separate measurements may be made using different subsets of BTSs. The MS 16 may receive a first location list, make a first measurement based on this list, then receive a second list, make a second measurement, etc, until an average position measurement of sufficient accuracy is obtained. This averaging method may also be applied to the measurement of RTDs.

In a modification to the embodiment described above, rather than sending a list of BTSs to the MS 16 which should be used in position determination, the network may send a list of BTSs which should not be used. The BTSs used by the MS 16 may then be selected from, for example, the non-excluded BTS contained in the handover list. This modification may be used advantageously to prevent the use of multiple BTSs present at the same location (it is often the case that several BTSs are mounted on the same mast).

The present invention may be used to "tag" moving objects, persons, or animals. In such applications, there is no need for voice communication and the MS hardware may be considerably reduced.

It will be appreciated that whilst the present invention has been illustrated above with reference to the GSM cellular radio telephone standard, the invention is applicable to other cellular telephone standards such as the US CDMA standards and the Japanese PCN standard.

The invention claimed is:

1. A method of determining the position of a mobile communications device within a cellular network, the method comprising the steps of:
   transmitting data to the mobile communication device from the cellular network, said data identifying to the mobile communication device a pre-determined list of radio channels corresponding to respective radio transmitters of the cellular network, said pre-determined list having been determined beforehand on the basis of the approximate position of the mobile communication device and in accordance with geometrical requirements for position determination, said pre-determined list having been stored in a central element; and
   causing the mobile communication device to listen on said identified channels, or on other channels excluding said identified channels, and to determine from information transmitted over the listened to channels data values related to the relative geometry of the mobile communication device and the radio transmitters transmitting the listened to channels; and
   determining the position of the mobile communication device using said determined data values.

2. A method according to claim 1, wherein said transmitters are provided by respective base transceiver stations and the data transmitted to the mobile device identifying the list of radio channels comprises a set of radio channel numbers known to the mobile device.

3. A method according to claim 1, wherein said data values are time relationship values related to the transmission delay times between the mobile device and the radio transmitters transmitting the listened to channels.

4. A method according to claim 3, wherein the time relationship values are Observed Time Differences (OTD) each being the difference between the transmission delay time between the mobile device and one of the radio transmitters transmitting the listened to channels, and the transmission delay time between the mobile device and a radio transmitter of a base transceiver station currently serving the mobile device.

5. A method according to claim 3, wherein said time relationship values are sent by the mobile communications device to the network where said determining step is carried out.

6. A method according to claim 1, wherein the list of radio channels identified to the mobile device contains those channels which the mobile device should try to listen to in order to obtain said data values from which the position of the mobile device can be determined.

7. Apparatus for determining the position of a mobile communications device within a cellular network, the apparatus comprising:
   a base transceiver station for transmitting data to the mobile communication device from the cellular network, said data identifying to the mobile communication device a pre-determined list of radio channels corresponding to respective radio transmitters of the cellular network, said pre-determined list having been determined on the basis of the approximate position of the mobile communication device and in accordance with geometrical requirements for position determination, said pre-determined list having been stored in a central element;
   a radio receiver at the mobile communication device for listening on said identified channels, or on other channels excluding said identified channels;
   first signal processing means coupled to said radio receiver for determining from information transmitted over the listened to channels data values related to the relative geometry of the mobile communication device and the radio transmitters transmitting the listened to channels; and
   second signal processing means for computing the position of the mobile communication device using said determined data values.

8. A mobile communications device comprising:
   a radio receiver for receiving data transmitted from a servicing base transceiver station of a cellular radio network, said data identifying to the mobile communication device a pre-determined list of radio channels corresponding to respective radio transmitters of the cellular network, and said pre-determined list having been determined on the basis of the approximate position of the mobile communication device and in accordance with geometrical requirements for position determination, and said radio receiver being arranged to listen on said identified channels, or on other channels excluding said identified channels, said pre-determined list having been stored in a central element;

first signal processing means coupled to said receiver for determining from information transmitted over the listened to channels data values related to the relative geometry of the mobile communication device and the radio transmitters transmitting the listened to channels; and a radio transmitter for transmitting said determined data values to said serving base transceiver station.

9. The method of claim 1 further comprising the step of storing in a central element a pre-determined list for each respective radio transmitter in the cellular network.

10. The method of claim 9 wherein the central element is a mobile positioning center.

11. The method of claim 1 further comprising the step of causing the mobile communications device to use pre-selected radio transmitters in the cellular network for position determination measurements.

12. The method of claim 1 wherein the pre-determined list comprises a list of radio transmitters in the network suitable to determine the position of the mobile communications device being served by a serving radio transmitter, based on a respective location of each radio transmitter.

13. The method of claim 1 wherein each radio transmitter in the network has a corresponding pre-determined list of associated radio transmitters in the network.

14. The method of claim 1 wherein the pre-determined list of radio channels corresponding to radio transmitters is independent of a signal transmission strength between each radio transmitter and the mobile communications device.

15. The method of claim 1 further comprising the step of pre-storing the pre-determined list of radio channels by associating other radio transmitters based on position with a selected serving radio transmitter, wherein each radio transmitter in the network has an associated stored pre-determined list.

* * * * *